US008751714B2

(12) United States Patent
Safranek et al.

(10) Patent No.: US 8,751,714 B2
(45) Date of Patent: Jun. 10, 2014

(54) IMPLEMENTING QUICKPATH INTERCONNECT PROTOCOL OVER A PCIE INTERFACE (75) Inventors: Robert J. Safranek, Portland, OR (US); Debendra Das Sharma, Santa Clara, CA (US); Ganapati N. Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 12/889,777

(22) Filed: Sep. 24, 2010

(65) Prior Publication Data

US 2012/0079156 A1   Mar. 29, 2012

(51) Int. Cl.
*G06F 13/42* (2006.01)
(52) U.S. Cl.
USPC .......................................................... 710/105
(58) Field of Classification Search
USPC .......................................................... 710/105
See application file for complete search history.

(56) References Cited

U.S. PATENT DOCUMENTS

| 7,062,610 | B2 * | 6/2006 | Conway ........................ 711/141 |
| 7,096,305 | B2 * | 8/2006 | Moll ............................... 710/312 |
| 7,155,572 | B2 * | 12/2006 | Hughes et al. ................. 711/122 |
| 7,174,430 | B1 * | 2/2007 | O'Krafka et al. ............. 711/141 |
| 7,522,633 | B2 * | 4/2009 | Ichino ........................... 370/466 |
| 7,783,842 | B2 * | 8/2010 | Arimilli et al. ............... 711/146 |
| 7,982,742 | B2 * | 7/2011 | Casparian et al. ............ 345/502 |
| 8,031,731 | B2 * | 10/2011 | Yu et al. ........................ 370/419 |
| 8,085,801 | B2 * | 12/2011 | Brueggen ...................... 370/412 |
| 8,180,981 | B2 * | 5/2012 | Kapil et al. .................... 711/159 |
| 8,234,458 | B2 * | 7/2012 | Langendorf et al. .......... 711/146 |
| 8,291,175 | B2 * | 10/2012 | Koka et al. .................... 711/147 |
| 8,294,591 | B2 * | 10/2012 | Reed et al. .................. 340/855.4 |
| 2004/0139283 | A1 * | 7/2004 | Arimilli et al. ............... 711/146 |
| 2009/0083488 | A1 * | 3/2009 | Madriles Gimeno et al. 711/118 |
| 2009/0164747 | A1 | 6/2009 | Harikumar et al. |
| 2009/0171647 | A1 | 7/2009 | Mannava et al. |
| 2009/0271601 | A1 * | 10/2009 | Zimmer et al. .................... 713/2 |
| 2009/0327564 | A1 | 12/2009 | Chitlur |
| 2010/0077179 | A1 | 3/2010 | Stillwell, Jr. et al. |
| 2011/0093646 | A1 * | 4/2011 | Koka et al. .................... 711/103 |

FOREIGN PATENT DOCUMENTS

WO   2012040648 A2   3/2012

OTHER PUBLICATIONS

An introduction to the Intel QuickPath Interconnect Jan. 2009.*
Wikipedia definition of Cache Coherence Mar. 12, 2013.*
International Search Report and Written Opinion Received for the PCT Application No. PCT/US2011/053128, mailed on Apr. 18, 2012, 8 pages.

(Continued)

*Primary Examiner* — Paul R Myers
(74) *Attorney, Agent, or Firm* — Law Office of R. Alan Burnett. P.S.; R. Alan Burnett (57) ABSTRACT

Methods and apparatus for implementing the Intel QuickPath Interconnect® (QPI) protocol over a PCIe interface. The upper layers of the QPI protocol are implemented over a physical layer of the PCIe interface via use of QPI data bit mappings onto corresponding PCIe x16, x8, and x4 lane configurations. A QPI link layer to PCIe physical layer interface is employed to abstract the QPI link, routing, and protocol layers from the underlying PCIe physical layer (and corresponding PCIe interface circuitry), enabling QPI protocol messages to be employed over PCIe hardware. Thus, QPI functionality, such as support for coherent memory transactions, may be implemented over PCIe interface circuitry.

22 Claims, 11 Drawing Sheets

(56) References Cited

OTHER PUBLICATIONS

Maddox, Robert A. et al. "The Architecture of the Intel® QuickPath Interconnect." Copyright © 2009 Intel Corporation. 13 pages.

Maddox, Robert Al. et al. "Weaving High Performance Multiprocessor Fabric: Architectural insightsinto Intel® QuickPath Interconnect." Intel Press. Version 1.0 Jul. 2009 Intel Corporation. Publisher: Richard Bowles. 328 pages. Relevant pages: Chapters 1-3 (or pp. 1-147).

International Preliminary Report on Patentability Received for the PCT Application No. PCT/US2011/053128, issuance on Mar. 26, 2013, 4 pages.

* cited by examiner

IMPLEMENTING QUICKPATH INTERCONNECT PROTOCOL OVER A PCIE INTERFACE

FIELD OF THE INVENTION

The field of invention relates generally to computer system interfaces and, more specifically but not exclusively relates to implementing the Intel® Quickpath Interconnect® protocol over a PCIe interface.

BACKGROUND INFORMATION

Computer systems typically employ one or more interconnects to facilitate communication between system components, such as between processors and memory. Interconnects and/or expansion interfaces may also be used to support built-in and add on devices, such as IO (input/output) devices and expansion cards and the like. For many years after the personal computer was introduced, the primary form of interconnect was a parallel bus. Parallel bus structures were used for both internal data transfers and expansion buses, such as ISA (Industry Standard Architecture), MCA (Micro Channel Architecture), EISA (Extended Industry Standard Architecture) and VESA Local Bus. In the early 1990's Intel Corporation introduced the PCI (Peripheral Component Interconnect) computer bus. PCI improved on earlier bus technologies by not only increasing the bus speed, but also introducing automatic configuration and transaction-based data transfers using shared address and data lines.

As time progressed, computer processor clock rates where increasing at a faster pace than parallel bus clock rates. As a result, computer workloads were often limited by interconnect bottlenecks rather than processor speed. Although parallel buses support the transfer of a large amount of data (e.g., 32 or even 64 bits under PCI-X) with each cycle, their clock rates are limited by timing skew considerations, leading to a practical limit to maximum bus speed. To overcome this problem, high-speed serial interconnects were developed. Examples of early serial interconnects include Serial ATA, USB (Universal Serial Bus), FireWire, and RapidIO.

Another standard serial interconnect that is widely used is PCI Express, also called PCIe, which was introduced in 2004 under the PCIe 1.0 standard. PCIe was designed to replace older PCI and PCI-X standards, while providing legacy support. PCIe employs point-to-point serial links rather than a shared parallel bus architecture. Each link supports a point-to-point communication channel between two PCIe ports using one or more lanes, with each lane comprising a bi-directional serial link. The lanes are physically routed using a crossbar switch architecture, which supports communication between multiple devices at the same time. As a result of its inherent advantages, PCIe has replaced PCI as the most prevalent interconnect in today's personal computers. PCIe is an industry standard managed by the PCI-SIG (Special Interest Group). As such, PCIe pads are available from many ASIC and silicon vendors.

Recently, Intel introduced the QuickPath Interconnect® (QPI). QPI was initially implemented as a point-to-point processor interconnect replacing the Front Side Bus on platforms using high-performance processors, such as Intel® Xeon®, and Itanium® processors. QPI is scalable, and is particularly advantageous in systems having multiple processors employing shared memory resources. QPI transactions employ packet-based transfers using a multi-layer protocol architecture. Among its features is support for coherent transaction (e.g., memory coherency), which isn't supported by PCIe.

Accordingly, it would be advantageous to extend QPI features and functionality such as transaction coherency to systems employing PCIe interfaces.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 8 shows the mapping of data bits in accordance with the a QPI flit when operating in a full-width mode employing 20 lanes;

FIG. 9 shows a mapping of the bits for an 80-bit QPI flit onto a PCIe x16 interface, according to one embodiment;

FIG. 10 shows a mapping of the bits for an 80-bit QPI flit onto a PCIe x8 interface, according to one embodiment;

FIG. 11 shows a mapping of the bits for an 80-bit QPI flit onto a PCIe x4 interface, according to one embodiment;

FIG. 12 shows a mapping of QPI bits onto a PCIe x16 interface using 128b/130b encoding, according to one embodiment;

FIG. 15 shows a mapping of two 80-bit flits onto a PCIe x16 interface, according to one embodiment;

DETAILED DESCRIPTION

Embodiments of methods and apparatus for implementing the QPI protocol over a PCIe interface are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Overview of QuickPath Interconnect

Figure 1:
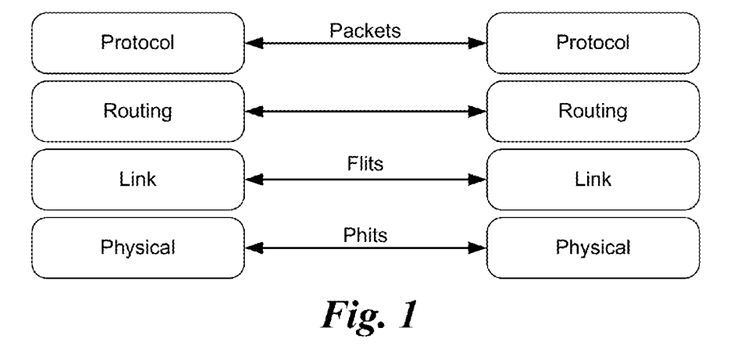
FIG. 1 shows the layers of the QPI protocol stack.

QPI transactions are facilitated via packetized messages transported over a multi-layer protocol. As shown in FIG. 1, the layers include a Physical layer, a Link layer, a Transport layer, and a Protocol layer. At the Physical layer, data is exchanged in 20-bit phits (Physical Units). At the link layer phits are aggregated into 80-bit flits (flow control units). At the Protocol layer, messages are transferred between agents using a packet-based transport.

Figure 2:
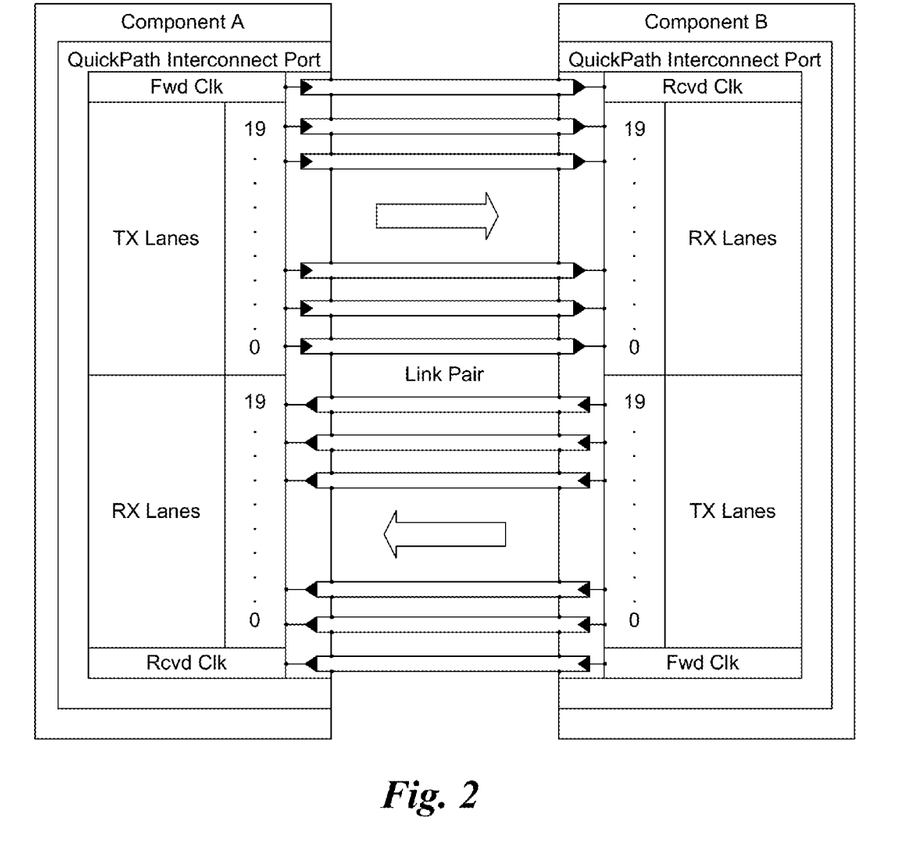
FIG. 2 is a schematic diagram illustrating the structure of a QPI link.

The Physical layer defines the physical structure of the interconnect and is responsible for dealing with details of operation of the signals on a particular link between two agents. This layer manages data transfer on the signal wires, including electrical levels, timing aspects, and logical issues involved in sending and receiving each bit of information across the parallel lanes. As shown in FIG. 2, the physical connectivity of each interconnect link is made up of twenty differential signal pairs plus a differential forwarded clock. Each port supports a link pair consisting of two uni-directional links to complete the connection between two components. This supports traffic in both directions simultaneously.

Components with QPI ports communicate using a pair of uni-directional point-to-point links, defined as a link pair, as shown in FIG. 2. Each port comprises a Transmit (Tx) link interface and a Receive (Rx) link interface. For the illustrated example, Component A has a Tx port that is connected to Component B Rx port. One uni-directional link transmits from Component A to Component B, and the other link transmits from Component B to Component A. The "transmit" link and "receive" link is defined with respect to a specific QPI agent. The Component A transmit link transmits data from Component A Tx port to Component B Rx port. This same Component A transmit link is the Port B receive link.

The second layer up the protocol stack is the Link layer, which is responsible for reliable data transmission and flow control. The Link layer also provides virtualization of the physical channel into multiple virtual channels and message classes. After the Physical layer initialization and training is completed, its logical sub-block works under the direction of the link layer, which is responsible for flow control. From this link operational point onwards, the logical sub-block communicates with the Link layer at a flit granularity (80 bits) and transfers flits across the link at a phit granularity (20 bits). A flit is composed of integral number of phits, where a phit is defined as the number of bits transmitted in one unit interval (UI). For instance, a full-width QPI link transmits and receives a complete flit using four phits. Each flit includes 72 bits of payload and 8 bits of CRC.

The Routing layer is responsible for ensuring that messages are sent to their proper destinations, and provides the framework for directing packets through the interconnect fabric. If a message handed up from the Link layer is destined for an agent in another device, the Routing layer forwards it to the proper link to send it on. All messages destined for agents on the local device are passed up to the protocol layer.

The Protocol layer serves multiple functions. It manages cache coherence for the interface using a write-back protocol. It also has a set of rules for managing non-coherent messaging. Messages are transferred between agents at the Protocol level using packets. The Protocol layer manages delivery of messages across multiple links, involving multiple agents in multiple devices. The system's cache coherency across distributed caches and memory controllers is maintained by distributed agents that participate in coherent memory space transactions, subject to rules defined by the Protocol layer. The QPI coherency protocol supports both home snoop and source snoop behaviors, as described below in further detail.

Brief Overview of PCI Express

As with QPI, PCIe supports a point-to-point interconnect using serial links made up of one or more lanes for each of transmission and receiving. A PCIe link has at least one lane—each lane represents a set of differential signal pairs (one pair for transmission, one pair for reception). To scale bandwidth, a link may aggregate multiple lanes denoted by xN where N may be any of the supported link widths. For example, as of the PCIe 3.0 specification, PCIe links include operations for x1, x2, x4, x8, x12, x16, and x32 lane widths. During hardware initialization, each PCI Express link is set up following a negotiation of lane widths and frequency of operation by the two agents at each end of the link.

Figure 3:
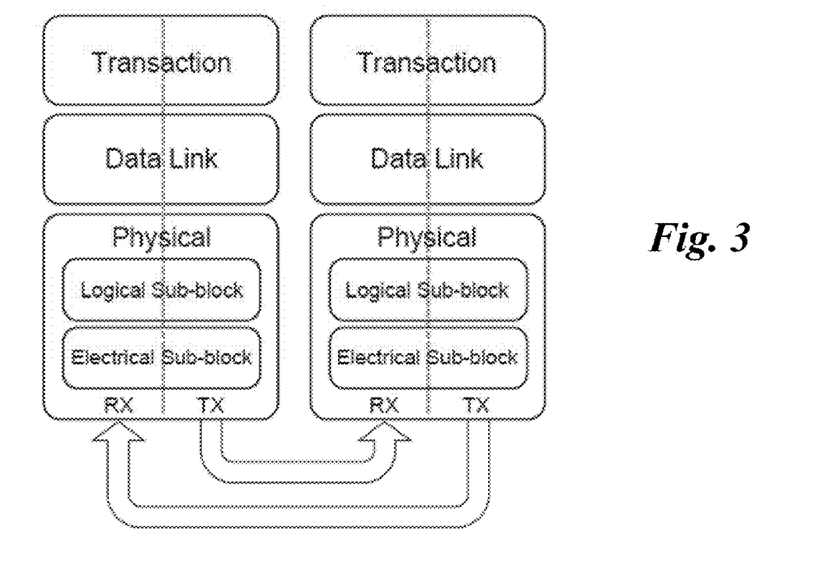
FIG. 3 shows the layers of the PCIe protocol stack.

As shown in FIG. 3, PCI Express uses a layered protocol, including a Physical Layer, Data Link Layer and Transaction Layer. The Physical Layer further includes a Logical Sub-block and an Electrical Sub-block. PCI Express uses packets to communicate information between components. Packets are formed in the Transaction and Data Link Layers to carry the information from the transmitting component to the receiving component. As the transmitted packets flow through the other layers, they are extended with additional information necessary to handle packets at those layers. At the receiving side the reverse process occurs and packets get transformed from their Physical Layer representation to the Data Link Layer representation and finally (for Transaction Layer Packets) to the form that can be processed by the Transaction Layer of the receiving device. FIG. 3 shows the conceptual flow of transaction level packet information through the layers.

Figure 4:
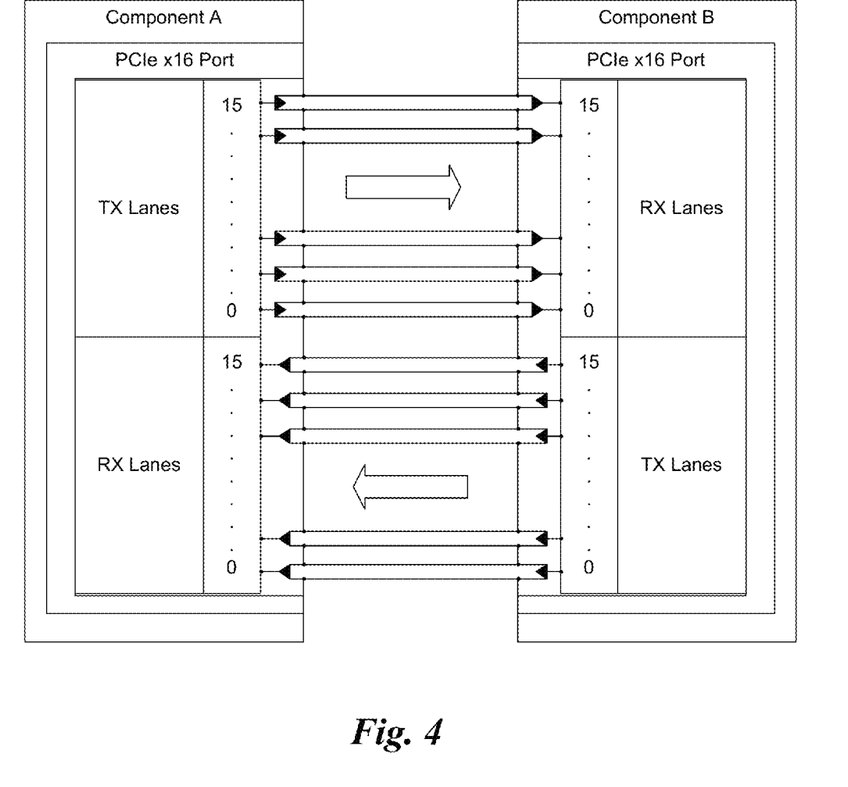
FIG. 4 is a schematic diagram illustrating the structure of a PCIe x16 link.

While there are some similarities between the QPI PHY and the PCIe PHY, there are also differences. Among these differences are the link configurations and data encoding. FIG. 4 shows the physical connectivity of a PCIe x16 link. As identified by "x16," this link employs 16 lanes, each comprising a differential signal pair. Rather than employ separate clock signals, clock data under PCIe are embedded in the data transmission and recovered via the physical layer at end points in the link.

Figure 5:
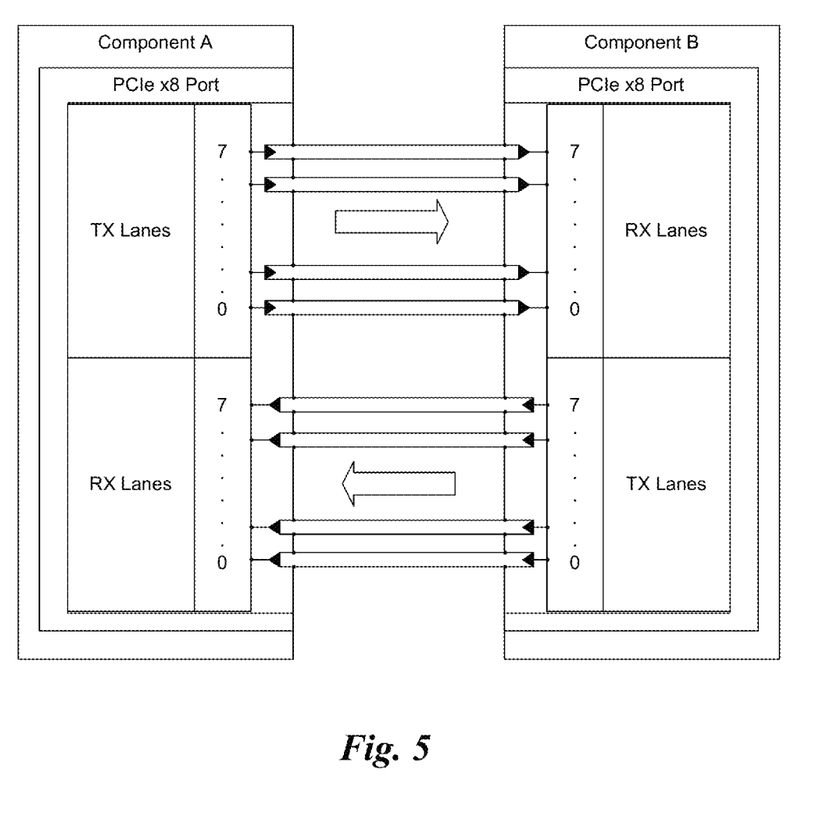
FIG. 5 is a schematic diagram illustrating the structure of a PCIe x8 link.
Figure 6:
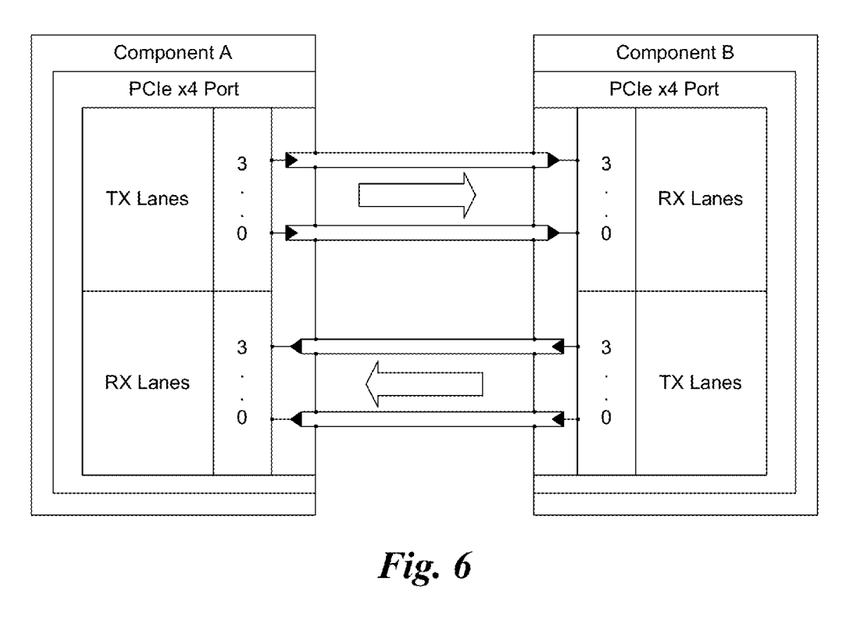
FIG. 6 is a schematic diagram illustrating the structure of a PCIe x4 link.

A PCIe interconnect having circuitry to support an x16 link may also be configured as two x8 links. Additionally, the width of an x16 link may be automatically reduced to an x8 link, or even an x4 link in response to detection of errors. FIG. 5 shows an example of a PCIe x8 link employing lanes 0-7, while FIG. 6 shows in example of a PCIe x4 link employing lanes 0-3.

QPI Over PCIe

Figure 7:
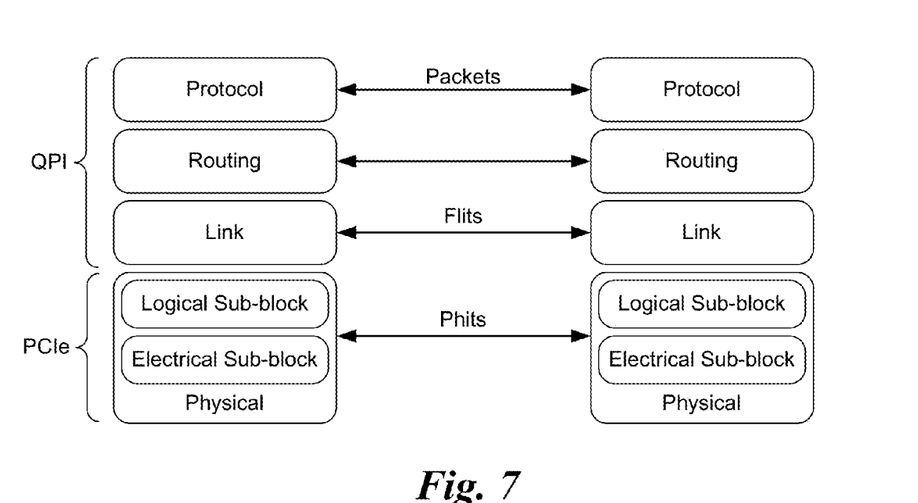
FIG. 7 shows the protocol layers employed by one embodiment of an implementation of the QPI protocol over a PCIe interface.

In accordance with aspects of the invention, techniques are disclosed for implementing the QPI protocol over PCIe interfaces. As illustrated in FIG. 7, the Protocol, Routing, and Link layers of the QPI protocol are implemented over the PCIe Physical Layer (PHY), with some modification to the PCIe logical PHY to support a QPI Link layer interface. This enables use of QPI over a PCIe interface (and corresponding hardware circuitry), without requiring any modification to the electrical architecture. As a result, QPI can be implemented using existing PCIe designs, including existing PCI pads.

The QPI over PCIe implementation supports Link bifurcation and Link degradation along with Lane reversal. In one embodiment, an x16 Link may be bifurcated to two independent x8s. Additionally, an x16 Link can be degraded to an x8 or x4 Link in the presence of errors. The degraded x8 can be in physical Lanes 0 . . . 7 or 8 . . . 15 and the degraded x4 can be in physical Lanes 0 . . . 3, 4 . . . 7, 8 . . . 11, 12 . . . 15. An x8 Link can be degraded to a x4 either in Lanes 0 . . . 3 or 4 . . . 7. In degraded mode, Lanes may be reversed.

In one embodiment, the PCIe PHY is in accordance with the PCIe 3.0 compliant PHY layer using 128b/130b encoding but without the physical layer framing (e.g., STP, END) when configured for QPI protocol. The QPI over PCIe links may operate at PCIe compliant rates (e.g., 8GT/s), as well as other rates that are capable of being supported by the devices at both ends of the link. The QPI protocol stack retains its Link Layer, including the flits, packet format, CRC, and retry mechanisms.

As discussed above, the unit of transfer at the link layer is an 80-bit flit. Accordingly, in order to maintain use of the QPI link layer over a PCIe PHY a mapping of the transmitted data bit format is performed. When using the full width of a QPI link an 80-bit flit is made up of four 20-bit phits, which are sequentially received over four UIs. This is illustrated in FIG. 8, wherein data labeled C0 . . . C7 correspond to the 8 CRC bits, and data labeled I0 . . . I71 correspond to the 72 bits of payload data (information bits). Additionally, the CRC and payload data are shown grouped into 8-bit bytes.

Under various embodiments, the 80-bit flit data is remapped from four 20-bit phits onto x16, x8 and x4 PCIe links. For example, in one embodiment, the 80-bit flit data in the 20-bit phits using four UIs is remapped from 20 lanes onto 16 lanes for a PCIe x16 PHY using 5 UIs. This is illustrated in FIG. 9, which shows the data bits transferred during each UI, as well as grouping of the 8-bit bytes in accordance with the original 80-bit flit of FIG. 7. In the embodiment of FIG. 10, the 80-bit flit data is mapped onto 8 lanes for a PCIe x8 configuration using 10 UIs. In the embodiment of FIG. 11, the 80-bit flit data is mapped onto 4 lanes of a PCIe x4 configuration using 20 UIs.

In the foregoing embodiments, the position of CRC bits and information bits are chosen to ensure that burst length errors are detected. The following error detection properties are guaranteed: (i) random single, double, and triple bit errors, (ii) burst errors of length of up to 8, and (iii) wire error detection for a x16 Link. In one embodiment, the same QPI CRC polynomial when transmitting QPI flits is employed. The layout of bits is not identical to QPI since the Link is an x16 (or x8 or x4) PCIe Link. The QPI flit level polynomial for CRC computation can be represented as $$I71x^{79}+I70x^{78}+I69x^{77}+\ldots+I0x^8+C7x^7+\ldots+C0x^0$$

After initialization, when sending QPI flits in one embodiment the PCIe PHY operates with 128b/130b encoding with the same scrambling rules and block alignment rules as defined by the PCIe 3.0 specification. During initialization, the PCIe PHY will start off with 8b/10b encoding at 2.5 GT/s Data Rate for the initial Link training, and then switch over to 128b/130b encoding through a speed change operation prior to sending any QPI flits. An example of 128b/130b encoding in accordance with one embodiment is shown in FIG. 12.

The Data blocks carrying QPI flits are slightly different than PCIe Data Blocks in 128b/130b encoding. The QPI Data Blocks use Sync Header bits of 01b and 10b in odd and even Lanes, respectively, as shown in FIG. 12, unlike PCIe Data Blocks where the Sync Header is always 10b.

A QPI Data Stream starts with the first QPI Data Block and ends on receipt of an Ordered Set other than SKP Ordered Set or on detection of a Framing Error by the Receiver. A Block is a QPI Data Block if the Sync Header bits are 01b and 10b in odd and even Lanes, respectively, and it either follows another QPI Data Block or a PCIe Data Block with only Logical IDLs or a valid Ordered Set. None of the other PCIe 3.0 Transmitter Framing rules need to be followed for a QPI Data Stream.

The Data Blocks with QPI flits do not carry any of the Framing Tokens of 128b/130b encoding, since each flit is 80-bits. The framing logic is expected to figure out the flit boundary due to the fixed size. A flit may straddle across two Data Blocks, as shown in FIG. 12.

Figure 13:
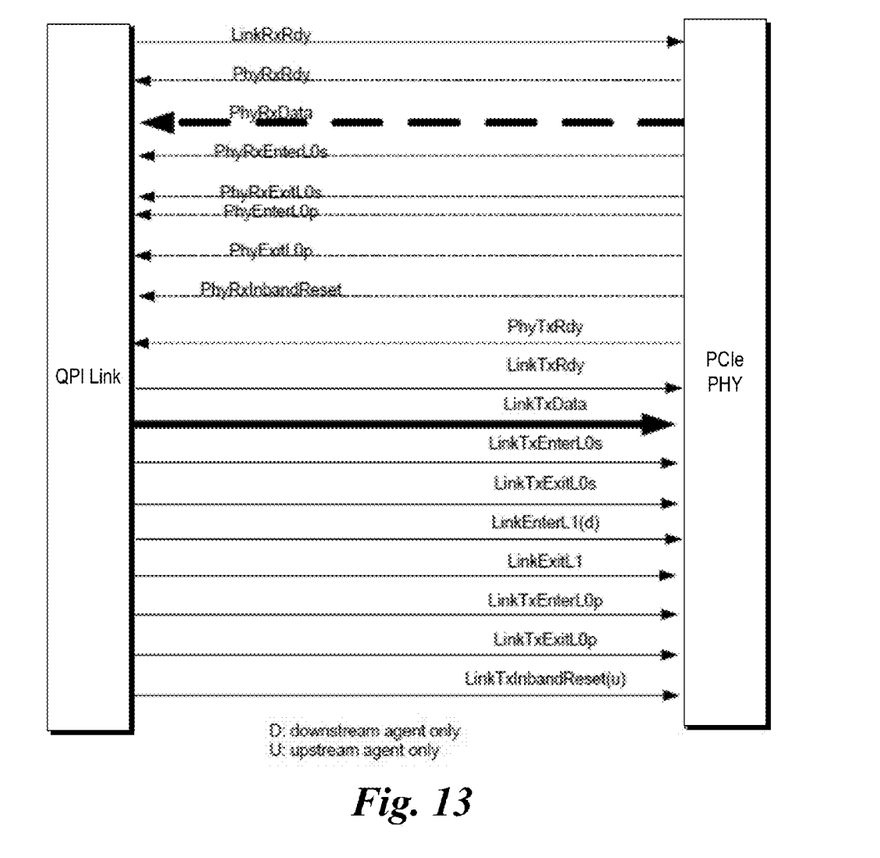
FIG. 13 shows signals used to implement a QPI link layer to PCIe physical layer interface, according to one embodiment.

As discussed above, under the QPI over PCIe protocol the upper layers of the QPI protocol remain the same. The lowest of these layers is the QPI Link layer. Accordingly, an interface between the QPI Link layer and the PCIe PHY layer is employed. One embodiment of signals used to facilitate this interface is shown in FIG. 13.

16 Bit-20 Bit Conversion

Figure 14:
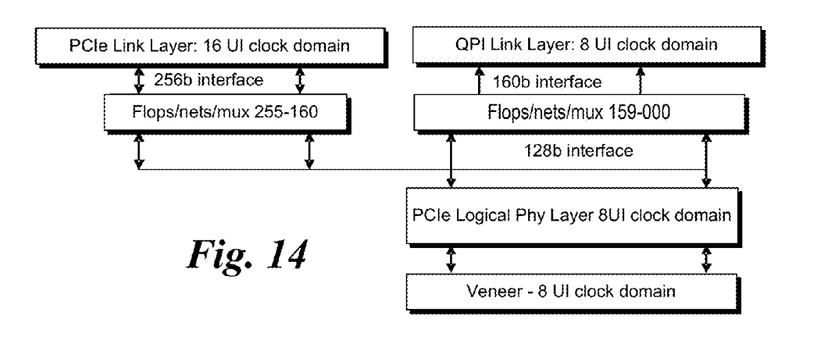
FIG. 14 is a block diagram showing logical and physical blocks used to implement a QPI link layer to PCIe physical layer interface, according to one embodiment.

When using a PCIe x16 link operating in normal full width mode, the data from the 16 lanes are mapped to 20 bit phits. The PCIe logical PHY layer delivers 8UI worth of data for an x16 link each clock (8×16=128). The QPI link layer operates at 8UI clock but over a 2 flit (160b) interface. Each flit has its own flit valid signal (i.e., it is possible to transmit a single flit on a clock). x16 to x20 conversion logic is essentially a 128b to 160b conversion. In one embodiment, flits are delivered to the QPI link layer as soon as possible (i.e., no wait to accumulate 160b before delivering flits). This logic portion also provides an interface for transfer between 8UI clock in PCIe PHY layer and 16UI clock in the PCIe data link layer. A block diagram illustrating one embodiment of an interface for performing this conversion is shown FIG. 14.

FIG. 15 shows the mapping of bits between 160b and 128b, according to one embodiment. The block of data bits on the left shows data for the 8UI clock domain (PCIe) as delivered through the PCIe Logical PHY layer (128b interface). It shows a 40 UI clock period (time is increasing downwards; 40 8UI×5UI per flit). The block of data bits on the right shows the mapping to individual flits for the QPI link layer. The bold lines mark flit boundaries, while the dashed lines mark the 8UI clock boundaries.

In addition to mapping QPI flits onto PCIe x16, x8, and x4 links, this concept can be extended to mapping onto PCIe x2 and x1 links using similar principles disclosed herein Generally, it is preferable to employ higher-width links, as this reduces the number of cycles (and thus latency) per transaction, but narrower-width links may also be employed.

It is further noted that both conventional PCIe links (i.e., PCIe links employing a PCIe protocol) and PCIe links over which QPI links are implemented may exist in the same system. The PCIe links do not need to be the same width or employ the same clock rate (i.e., speed). Moreover, QPI links over PCIe may employ different link widths and clock rates within the same system.

Exemplary Implementation of Maintaining Cache Coherency Over PCIe

One of the inherent features of QPI is support for coherent memory transactions. This is implemented via corresponding messages in connection with memory transactions that are handled by the upper layers of the QPI protocol. The messages are communicated to applicable agents using packets, as defined by the QPI protocol layer. The following message classes are employed by the QPI protocol.

TABLE 1

| Name | Abbr | Ordering | Data Payload |
|---|---|---|---|
| Snoop | SNP | None | No |
| Home | HOM | Required for address | No |
| Non-data Response | NDR | None | No |
| Data Response | DRS | None | Yes |
| Non-coherent Standard | NCS | None | No |
| Non-coherent Bypass | NCB | None | Yes |

The requests and response messages affect either the coherent system memory space or are used for non-coherent transactions (such as configuration, memory-mapped I/O, interrupts, and messages between agents).

The system's cache coherency across distributed caches and integrated memory controllers is maintained by the distributed agents that participate in the coherent memory space transactions, subject to the rules defined by the protocol layer. The QPI coherency protocol allows both home snoop and source snoop behaviors. Home snoop behavior is optimized for greater scalability, whereas source snoop is optimized for lower latency. The latter is used primarily in smaller scale systems where the smaller number of agents creates a relatively low amount of snoop traffic. Larger systems with more snoop agents could develop a significant amount of snoop traffic and hence would benefit from a home snoop mode of operation. As part of the coherence scheme, the QPI protocol implements the well-known MESI (Modified, Exclusive, Shared, and Invalid) protocol and, optionally, introduces a new F-(Forward) state.

In one embodiment, the QPI protocol implements a modified format of the MESI coherence protocol. The standard MESI protocol maintains every cache line in one of four states: modified, exclusive, shared, or invalid. A new read-only forward state has also been introduced to enable cache-to-cache clean line forwarding. Characteristics of these states are summarized in Table 2 below. Only one agent can have a line in this F-state at any given time; the other agents can have S-state copies. Even when a cache line has been forwarded in this state, the home agent still needs to respond with a completion to allow retirement of the resources tracking the transaction. However, cache-to-cache transfers offer a low-latency path for returning data other than that from the home agent's memory.

TABLE 2

| State | Clean/Dirty | May Write? | May Forward? | May Transition To? |
|---|---|---|---|---|
| M—Modified | Dirty | Yes | Yes | — |
| E—Exclusive | Clean | Yes | Yes | MSIF |
| S—Shared | Clean | No | No | I |
| I—Invalid | — | No | No | — |
| F—Forward | Clean | No | Yes | SI |

The QPI coherency protocol consists of two distinct types of agents: caching agents and home agents. A processor will typically have both types of agents and possibly multiple agents of each type.

A caching agent represents an entity which may initiate transactions into coherent memory, and which may retain copies in its own cache structure. The caching agent is defined by the messages it may sink and source according to the behaviors defined in the cache coherence protocol. A caching agent can also provide copies of the coherent memory contents to other caching agents.

A home agent represents an entity which services coherent transactions, including handshaking as necessary with caching agents. A home agent supervises a portion of the coherent memory. Home agent logic is not specifically the memory controller circuits for main memory, but rather the additional QPI logic which maintains the coherency for a given address space. It is responsible for managing the conflicts that might arise among the different caching agents. It provides the appropriate data and ownership responses as required by a given transaction's flow.

In accordance with one embodiment, coherent memory transactions are supported via use of the QPI protocol over PCIe in a blade server. For example, blade server system 1600 in FIG. 16 includes multiple blades, as illustrated by Blades 1 and 2. Each blade includes various processing and memory resources operatively coupled by corresponding circuitry. Although depicted identically in FIG. 16, it will be understood that each blade in a blade server may have more or less processing and memory resources.

Figure 16:
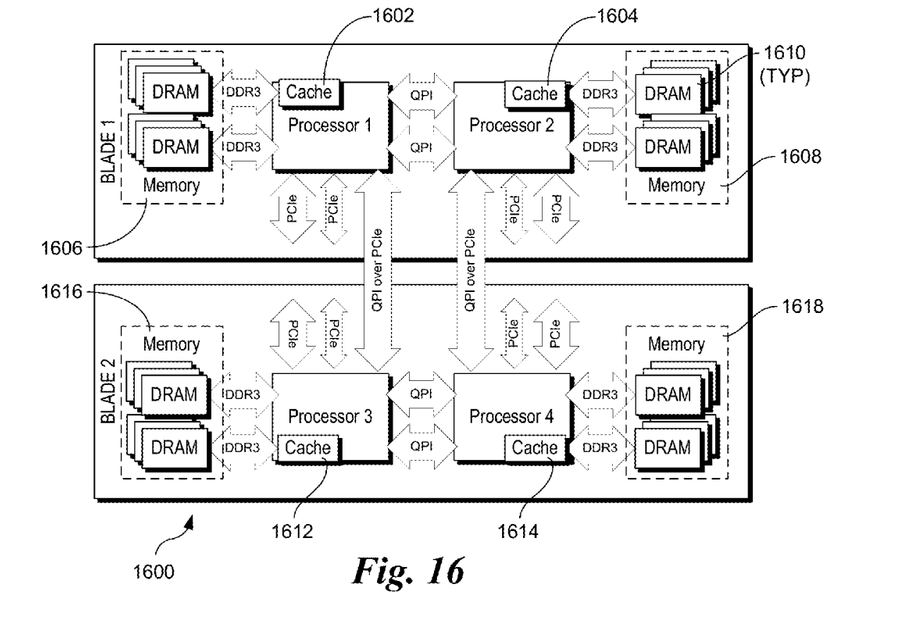
FIG. 16 is a schematic diagram showing a pair of blades for a blade server configured to implement the QPI protocol over a PCIe interface, according to one embodiment.

In further detail, Blade 1 includes a pair of Processors 1 and 2, each representing a processor or CPU with one or more processor cores. Moreover, Processors 1 and 2 may also comprise a system on a chip. Processor 1 includes a local cache 1602, while Processor 2 includes a local cache 1604. Each of Processor 1 and 2 is connected to a respective memory store 1606 and 1608, wherein each memory store includes one or more memory modules or banks of memory chips, as depicted by DRAM blocks 1610. Similarly, Blade 2 includes a pair of Processors 3 and 4 including respective local caches 1612 and 1614 and memory stores 1616 and 1618.

The memory modules 1606, 1608, 1612, and 1614 are operatively coupled to their respective processor via a corresponding memory controller (not shown), which may be included within each of Processors 1-4, or may comprise a separate chipset component. For simplicity, the memory interfaces are represented in FIG. 16 by double arrows labeled "DDR3" representing a Double Date Rate 3 memory interface. DDR3 is merely exemplary, as other memory interface standards may also be employed.

Processors 1 and 2 are communicatively coupled via a QPI interface, as depicted by the double arrows labeled "QPI." Similarly, Processors 3 and 4 are communicatively coupled via a QPI interface. In addition, each of Blades 1 and 2 includes one or more PCIe interfaces, as depicted by double arrows labeled "PCIe." Generally, these interfaces may be any type of PCIe interface, including PCIe x1, x2, x4, x8, x16, and x32. The PCIe interfaces may be used to facilitate communication with various input/output (IO) devices (not shown for simplicity).

Each of Blades 1 and 2 includes a PCIe x16 or x8 interface that is operatively coupled to a backplane interface or edge connector (depending on the blade configuration). The blade server in which Blades 1 and 2 may be installed includes appropriate interconnect circuitry to facilitate communications between Blades 1 and 2 over a PCIe x16 and/or PCIe x8 interface. Moreover, Blades 1 and 2 are configured to support one or more QPI over PCIe interfaces in accordance with the embodiments described herein, as illustrated by the double arrows labeled QPI over PCIe in FIG. 16.

Home Snoop Example

Figure 17:
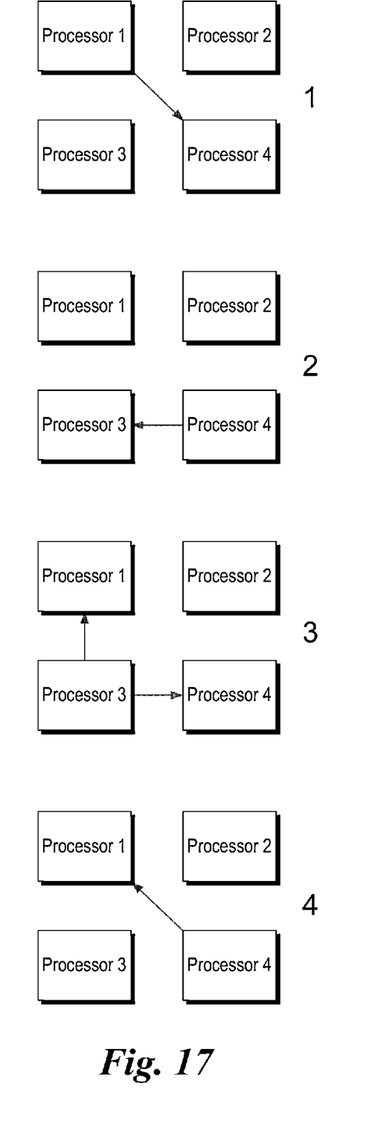
FIG. 17 is a message flow diagram illustrating messaging operations to support a home snoop in accordance with the QPI protocol using the blade server of FIG. 16.

The home snoop coherency behavior defines the home agent as responsible for the snooping of other caching agents. The basic flow for a message involves up to four operations, as illustrated in the example of FIG. 17, wherein the processors shown correspond to Processors 1, 2, 3, and 4 of the blade server of FIG. 16. In this example, a simplified read request to an address managed by a remote agent is performed, where Processor 1 is the requesting caching agent, Processors 2 and 3 are peer caching agents, and Processor 4 is the home agent for the cache line. In addition, Processor 3 has a copy of the cache line in either an M, E, or F-state.

In a first operation, the caching agent (Processor 1) issues a request to the home agent (Processor 4) that manages the memory in question. In general, each processor will manage a corresponding portion of shared memory, typically via address range mapping or the like. Meanwhile, each home agent maintains a directory structure that is used to track which agents are holding cache lines corresponding to memory the home agent manages.

Next, in a second operation, the home agent (Processor 4) checks its directory structure to target a snoop to the caching agent identified as holding a cache line corresponding to the memory address in the request. In this example, the directory structure indicates that Processor 3 holds the cache line, and thus Processor 4 sends a snoop request to Processor 3.

In response to the snoop request, the caching agent sends a response back to the home agent with the status of the address in a third operation. In this example, Processor 3 has a copy of the cache line in the proper state, and so it delivers a copy of the cache line data to Processor 1. Processor 3 also responds to Processor 4 indicating that it has sent the data to Processor 1. The home agent resolves any conflicts, and if necessary, returns the data to the original requesting cache agent (after first checking to see if data was delivered by another caching agent, which in this case it was), and the transaction is completed. This is shown in a fourth operation, wherein Processor 4 provides a message to Processor 1 indicating the transaction is complete.

The QPI home snoop behavior implementation typically includes a directory structure to target the snoop to the specific caching agents that may have a copy of the data. This has the effect of reducing the number of snoops and snoop responses that the home agent has to deal with on the interconnect fabric. This is very useful in systems that have a large number of agents, although it comes at the expense of latency and complexity. Therefore, home snoop is targeted at systems optimized for a large number of agents.

Source Snoop Example

Figure 18:
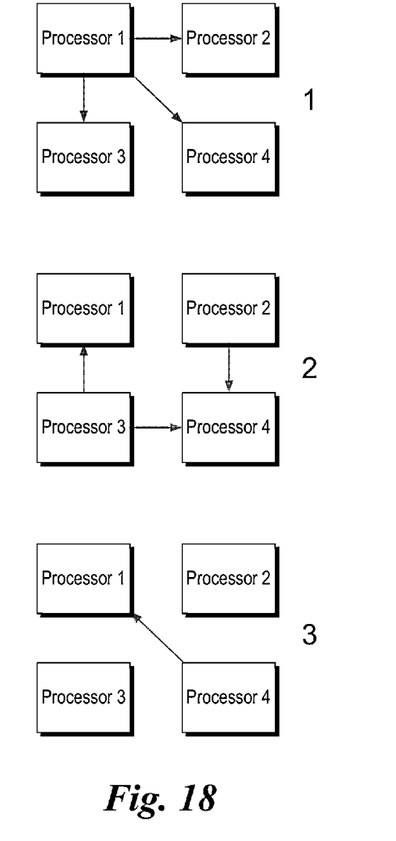
FIG. 18 is a message flow diagram illustrating messaging operations to support a source snoop in accordance with the QPI protocol using the blade server of FIG. 16.

The source snoop coherency behavior streamlines the completion of a transaction by allowing the source of the request to issue both the request and any required snoop messages. The basic flow for a message involves only three operations, sometimes referred to as a two-hop snoop since data can be delivered in the second operation. With reference to FIG. 18, the same memory read request discussed above in the home snoop example proceeds as follows.

During a first operation, the caching agent (Processor 1) issues a request to the home agent that manages the memory in question (Processor 4) and issues snoops to all the other caching agents (Processors 2 and 3) to see if they have copies of the memory in question.

During a second operation the caching agents respond to the home agent with the status of the address. In this example, Processor 3 has a copy of the line in the proper state, so the data is delivered directly to the requesting cache agent (Processor 1). Processors 2 and 3 also provide respective status requests back to the home agent.

During a third operation, the home agent resolves any conflicts and completes the transaction by providing a corresponding message to the requesting caching agent (Processor 1).

The source snoop behavior saves a "hop," thereby offering a lower latency. This comes at the expense of requiring agents to maintain a low latency path to receive and respond to snoop requests; it also imparts additional bandwidth stress on the interconnect fabric, relative to the home snoop method.

In accordance with the embodiments disclosed herein, features and functionality of the QPI protocol can be extended onto PCIe hardware without requiring any changes to the physical interface (i.e., interface circuitry). Thus, the QPI protocol may be implemented using existing PCIe circuit designs. As a result, QPI protocol features such as coherent memory transactions can be extended to PCIe interfaces.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A system, comprising:
a plurality of processors, each having a local cache and operatively coupled to a respective memory store having a portion of shared memory for the system; and
Peripheral Component Interconnect Express (PCIe) interconnect and interface circuitry, operatively coupling at least two of the processors, the PCIe interface circuitry including,
circuitry and logic to implement a PCIe Physical Layer (PHY) including a PCIe PHY logical sub-layer and a PCIe PHY electrical sublayer;
logic to implement a protocol layer, routing layer and link layer for a QuickPath Interconnect (QPI) protocol over the PCIe PHY;
logic to implement an interface between the QPI link layer and the PCIe PHY logical sub-layer under which the QPI link layer interface comprises a 160-bit (160b) interface and the PCIe PHY logical sub-layer interface comprises a 128-bit (128b) interface;
a transmit port including logic to implement a 160b to 128b conversion to interface data to be transmitted via the PCIe PHY from the QPI link layer interface to the PCIe PHY logical sub-layer interface; and
a receive port including logic to implement a 128b to 160b conversion to interface data received at the receive port via the PCIe PHY from the PCIe PHY logical sub-layer interface to the QPI link layer interface,
wherein the at least two processors are configured to implement the QPI protocol using corresponding QPI messaging sent over PCIe interconnect and interface circuitry to support coherent memory transactions in the system.

2. The system of claim 1, wherein the system comprises a blade server having a plurality of blades including PCIe interconnect and interface circuitry configured to communicatively couple blade components via a corresponding backplane or edge connector, and the system is configured to enable QPI messaging between processors on separate blades over the PCIe interconnect and interface circuitry.

3. The system of claim 1, wherein the processors are configured to implement at least one of a home snoop and source snoop in conjunction with performing a coherent memory transaction via use of QPI messaging sent over the PCIe interconnect and interface circuitry.

4. A method, comprising:
implementing an link between a transmit port and a receive port employing a protocol layer, routing layer and link layer for a QuickPath Interconnect (QPI) protocol over a Peripheral Component Interconnect Express (PCIe) physical layer (PHY) comprising PCIe interconnect and interface circuitry, wherein the PCIe PHY includes a PCIe PHY logical sub-layer and a PCIe PHY electrical sub-layer;
implementing an interface between the QPI link layer and the PCIe PHY logical sub-layer under which the QPI link layer interface comprises an 160-bit (160b) interface and the PCIe PHY logical sub-layer interface comprises a 128-bit (128b) interface;
performing a 128b to 160b conversion when interfacing data from the PCIe PHY logical sub-layer interface to the QPI link layer interface;
performing a 160b to 128b conversion when interfacing data from the QPI link layer interface to the PCIe PHY logical sub-layer interface; and
transmitting QPI data blocks over the interconnect link from the transmit port to the receive port using the 160b to 128b conversion at the transmit port and the 128b to 160b conversion at the receive port.

5. The method of claim 4, further comprising:
initially operating the link using 8-bit/10-bit (8b/10b) encoding for the PCIe PHY during link training;
switching operation of the link from 8b/10 encoding to a 128b/130b encoding for the PCIe PHY;
verifying the transmit port and receive port are ready to transfer data; and
transferring QPI data blocks over the PCIe PHY using 128b encoding.

6. The method of claim 5, wherein verifying the receive port is ready to transfer data comprises:
receiving a link receiver ready signal from the QPI link layer interface at the PCIe PHY logical sub-layer interface indicating the QPI link layer is ready to receive data; and
sending a PHY receiver ready signal from the PCIe PHY logical sub-layer interface to the QPI link layer interface indicating the PCIe PHY is ready to begin receiving data.

7. The method of claim 5, wherein verifying the transmit port is ready to transfer data comprises:
sending a PHY transmitter ready signal from the PCIe PHY logical sub-layer to the QPI link layer interface indicating the PCIe PHY is ready to begin transmission of data; and
receiving a link transmit ready signal from the QPI link layer interface at the PCIe PHY logical sub-layer interface indicating the QPI link layer is ready to begin transmission of data.

8. The method of claim 5, further comprising operating the PCIe PHY in accordance with a PCIe specification except for not employing physical layer framing defined by the PCIe specification during transfer of QPI data blocks over the link.

9. The method of claim 4, wherein the interconnect link comprises a multi-lane link having a plurality of lanes coupled between the transmit port and the receive port, the method further comprising transferring QPI data blocks over the link having different sync header bits for odd lanes and even lanes.

10. The method of claim 4, wherein the 160b encoding includes CRC (Cyclic Redundancy Check) bits and information bits, and the position of the CRC and information bits are chosen to ensure burst length errors are detected including random single, double, and triple bit errors.

11. The method of claim 4, wherein data is transferred at the QPI link layer using flits (flow control units), and wherein flits in a portion of the QPI data blocks that are transmitted straddle two QPI data blocks.

12. The method of claim 4, further comprising employing an 8 Unit Intervals (UI) clock domain at each of the QPI link layer and the PCIe PHY logical sub-layer.

13. An apparatus comprising:
a PCIe Physical Layer (PHY) interface including circuitry and logic to implement a PCIe PHY including a PCIe PHY logical sub-layer and a PCIe PHY electrical sub-layer;
logic to implement a protocol layer, routing layer and link layer for a QuickPath Interconnect (QPI) protocol over the PCIe PHY;
logic to implement an interface between the QPI link layer and the PCIe PHY logical sub-layer under which the QPI link layer interface comprises a 160-bit (160b) interface and the PCIe PHY logical sub-layer interface comprises a 128-bit (128b) interface;
a transmit port including logic to implement a 160b to 128b conversion to interface data to be transmitted via the PCIe PHY from the QPI link layer interface to the PCIe PHY logical sub-layer interface; and
a receive port including logic to implement a 128b to 160b conversion to interface data received at the receive port via the PCIe PHY from the PCIe PHY logical sub-layer interface to the QPI link layer interface.

14. The apparatus of claim 13, wherein the apparatus comprises a first link interface that is configured to be connected to a second link interface via an interconnect link, and wherein the apparatus further comprises logic to:
initially operate the PCIe PHY using 8-bit/10-bit (8b/10b) encoding during link training;
switch the encoding for the PCIe PHY from 8b/10 to 128b/130b encoding;
verify the transmit port is ready to transmit data;
verify the receive port is ready to receive data;
transmit QPI data blocks outbound from the transmit port over the PCIe PHY using 128b encoding; and
receive QPI data block at the receive port via the PCI PHY using 128b encoding.

15. The apparatus of claim 14, wherein the logic to verify the transmit port is ready to transfer data comprises logic to:
send a PHY transmitter ready signal from the PCIe PHY logical sub-layer to the QPI link layer interface; and
send a link transmit ready signal from the QPI link layer interface to the PCIe PHY logical sub-layer interface indicating the QPI link layer is ready to begin transmission of data.

16. The apparatus of claim 14, wherein the logic to verify the receive port is ready to receive data comprises logic to:

send a link receiver ready signal from the QPI link layer interface to the PCIe PHY logical sub-layer interface indicating the QPI link layer is ready to receive data; and send a PHY receiver ready signal from the PCIe PHY logical sub-layer interface to the QPI link layer interface indicating the PCIe PHY is ready to begin receiving data from the PCIe PHY interface.

17. The apparatus of claim 13, further comprising logic to operate the PCIe PHY in accordance with a PCIe specification except for not employing physical layer framing defined by the PCIe specification during transmission and receiving of QPI data blocks.

18. The apparatus of claim 13, wherein the PCIe PHy interface is configured to transmit and receive data via respective multi-lane links having a plurality of lanes including odd and even lanes to be coupled to the transmit port and the receive port, and wherein the apparatus further comprises logic to transmit and receive QPI data blocks having different sync header bits for odd lanes and even lanes.

19. The apparatus of claim 13, wherein the QPI link layer employs 160b encoding including CRC (Cyclic Redundancy Check) bits and information bits, and the position of the CRC and information bits are chosen to ensure burst length errors are detected including random single, double, and triple bit errors.

20. The apparatus of claim 13, wherein data is transferred at the QPI link layer using flits (flow control units), and wherein flits in a portion of the QPI data blocks that are transmitted straddle two QPI data blocks.

21. The apparatus of claim 13, further comprising logic to transmit QPI blocks using a first 8 Unit Intervals (UI) clock domain at the QPI link layer and a second 8UI clock domain at the PCIe PHY logical sub-layer.

22. The apparatus of claim 21, further comprising logic to implement a PCIe link layer and transmit PCIe data over a 16 UI clock domain at the PCIe link layer.

* * * * *